United States Patent
Maisotsenko et al.

(10) Patent No.: US 9,982,907 B2
(45) Date of Patent: May 29, 2018

(54) METHOD AND SYSTEMS FOR ENERGY-SAVING HEATING AND HUMIDIFYING OF BUILDINGS USING OUTSIDE AIR

(71) Applicants: Valeriy S. Maisotsenko, Centennial, CO (US); Oleksandr I. Galaka, Kyiv (UA)

(72) Inventors: Valeriy S. Maisotsenko, Centennial, CO (US); Oleksandr I. Galaka, Kyiv (UA)

( * ) Notice: Subject to any disclaimer, the term of this patent is extended or adjusted under 35 U.S.C. 154(b) by 22 days.

(21) Appl. No.: 15/173,903

(22) Filed: Jun. 6, 2016

(65) Prior Publication Data

US 2017/0016645 A1    Jan. 19, 2017

Related U.S. Application Data

(60) Provisional application No. 62/193,820, filed on Jul. 17, 2015.

(51) Int. Cl.
*F24F 12/00* (2006.01)
*F24F 6/04* (2006.01)
(Continued)

(52) U.S. Cl.
CPC ............ *F24F 12/006* (2013.01); *F24D 5/02* (2013.01); *F24F 3/044* (2013.01); *F24F 6/043* (2013.01);
(Continued)

(58) Field of Classification Search
CPC ........ F24F 12/00; F24F 12/001; F24F 12/006; F24F 3/14
(Continued)

(56) References Cited

U.S. PATENT DOCUMENTS 4,257,389 A * 3/1981 Texidor .............. F24F 3/14
126/113
4,771,611 A * 9/1988 McNab .............. F24F 3/147
62/311
(Continued)

FOREIGN PATENT DOCUMENTS

CA         2492530 A1 *  1/2004  .......... F01K 21/047

OTHER PUBLICATIONS

Life below the wet bulb—The Maisotsenko cycle—Ken Wicker (2003).*
(Continued)

*Primary Examiner* — Len Tran
*Assistant Examiner* — Jenna M Hopkins
(74) *Attorney, Agent, or Firm* — Aleksandr Smushkovich

(57) ABSTRACT

Energy-saving method/system for heating and humidifying a building or car's saloon are disclosed. The method includes—drawing in an outside airstream,—passing it via a dry channel and then, via a wet channel, in an opposite direction. Thereafter, the outside airstream is heated and directed to the building as supply air. An exhaust airstream from the building is introduced into a product channel. The wet channel is situated between the dry and product channels. The wet channel is in pairwise heat-exchange interactions with the dry and product channels. Water vapor, contained in the exhaust airstream, is condensed, discharged into the atmosphere at a temperature closed to the dew point. The outside airstream, passed along the wet channel, is transfer-heated and humidified by the exhaust airstream. Water from the product channel is used for wetting the wet channel. The system includes at least two membranes arranged between the channels.

3 Claims, 5 Drawing Sheets

(51) Int. Cl.
| | |
|---|---|
| *F24F 3/044* | (2006.01) |
| *F24D 5/02* | (2006.01) |
| *F24F 5/00* | (2006.01) |
| *F24F 3/14* | (2006.01) |
| *F24F 3/153* | (2006.01) |
| *F24F 6/00* | (2006.01) |
| *F24F 6/02* | (2006.01) |
| *F24F 6/08* | (2006.01) |
| *F28D 21/00* | (2006.01) |

(52) U.S. Cl.
CPC ............... *F24F 3/14* (2013.01); *F24F 3/153* (2013.01); *F24F 6/00* (2013.01); *F24F 6/02* (2013.01); *F24F 6/08* (2013.01); *F24F 12/00* (2013.01); *F24F 12/001* (2013.01); *F24F 2005/0064* (2013.01); *F24F 2221/34* (2013.01); *F28D 21/0014* (2013.01); *F28D 21/0015* (2013.01); *Y02A 30/272* (2018.01); *Y02B 10/24* (2013.01); *Y02B 30/52* (2013.01); *Y02B 30/563* (2013.01)

(58) Field of Classification Search
USPC .................................................. 165/47, 48.1
See application file for complete search history.

(56) References Cited

U.S. PATENT DOCUMENTS

| | | | | |
|---|---|---|---|---|
| 4,910,971 A * | 3/1990 | McNab | ............... | F24F 3/044 62/310 |
| 5,050,391 A * | 9/1991 | Tsimerman | ........... | F24F 3/1411 165/104.11 |
| 5,860,284 A * | 1/1999 | Goland | ................ | F24F 3/1423 165/60 |
| 6,338,258 B1 * | 1/2002 | Lee | ...................... | F24F 5/0035 62/121 |
| 7,093,452 B2 * | 8/2006 | Chee | ...................... | F24F 1/022 62/175 |
| 9,207,018 B2 * | 12/2015 | Jarvis | ...................... | F28C 3/08 |
| 2002/0038552 A1 * | 4/2002 | Maisotsenko | ............. | F28D 5/02 62/121 |
| 2003/0145609 A1 * | 8/2003 | Maisotsenko | .......... | F24F 3/1411 62/121 |
| 2003/0177771 A1 * | 9/2003 | Maisotsenko | ............. | F28D 5/00 62/121 |
| 2003/0209017 A1 * | 11/2003 | Maisotsenko | .......... | F24F 3/1411 62/121 |
| 2007/0289320 A1 * | 12/2007 | Bhatti | ..................... | F24F 3/14 62/179 |
| 2014/0260398 A1 * | 9/2014 | Kozubal | ................ | F25B 15/00 62/271 |
| 2015/0308711 A1 * | 10/2015 | Gillan | .................... | F24H 8/003 122/14.3 |
| 2016/0069239 A1 * | 3/2016 | Freeman | ............... | F01N 3/2066 60/324 |
| 2017/0276383 A1 * | 9/2017 | Gilbert | ..................... | F28F 3/08 |

OTHER PUBLICATIONS

Evaluation of the Maisotsenko Power Cycle Thermodynamic Efficiency—Ilya Reyzin (2011).*
A Review of Potential of Maisotsenko Cycle in Energy Saving Applications Using Evaportive Cooling—Wani et al. (2012).*
Coolerado Cooler Helps to Save Cooling Energy and Dollars—EPA (2006).*

* cited by examiner

METHOD AND SYSTEMS FOR ENERGY-SAVING HEATING AND HUMIDIFYING OF BUILDINGS USING OUTSIDE AIR

CROSS REFERENCES TO RELATED APPLICATIONS

The present patent application claims the benefit of a U.S. provisional patent application Ser. No. 62/193,820 filed on Jul. 17, 2015, the disclosure of which is incorporated herein in its entirety by reference.

FIELD OF THE INVENTION

The present invention relates to methods and systems for heating and humidifying of buildings, rooms, car's saloons, or the like in winter time utilizing psychrometric energy from outside air through the Maisotsenko Cycle. This method allows for a substantial economy in energy consumption compared to the hitherto known systems, via a unique humidifying air recuperator.

This invention also relates to heat pumps. In particular, this invention relates to an advanced heat pump through utilizing renewable energy, specifically, psychrometric energy from outside air to remove moisture from the preheated exhaust air coming from a building and then transfer this moisture and heat to the dry and cold outside air, wherein during its passing through dry and after wet working channels of the humidifying air recuperator. Using this apparatus, it is possible to implement an optimal heat recovery process with a maximum efficiency in winter time.

The invention further relates to methods and systems of recovering sensible and latent heat of condensation from preheated exhaust air, which is particularly suitable for use in heating, ventilation and air conditioning (HVAC) systems for buildings, but is also adaptable for use in any kind of essentially closed spaces, for example, for a cabin/saloon of a car.

BACKGROUND OF THE INVENTION

The proposed invention brings a significant advantage, since it allows using displacement heating (100% fresh air) for buildings. Traditional heating systems for buildings typically use recirculation eating systems (only 15% fresh air). They do not use displacement heating for buildings because producing of displacement heat for the traditional heating systems is very expensive.

Also, the proposed system is cheaper than the traditional heating systems because it includes only two apparatuses (a humidifying air recuperator and a heater), whereas a traditional system typically includes three apparatuses (a pre-heater, a re-heater, and a humidifier).

With the advent of energy crisis and an increase in the cost of energy, considerable efforts have been directed toward developing means and methods for conserving energy especially for HVAC systems. The efficient use of energy is urgently needed from an economic and ecological perspective. Energy conservation is therefore a measure for both lowering costs and protecting the environment and it can be achieved either by cutting energy use or through intelligent technical solutions like the Maisotsenko Cycle (M-Cycle). The energy-related and environmental performance of heating and humidifying systems for buildings has a great deal to do with this issue.

In winter the outside air conditions are cold and dry. As a result, there will be a continuous transfer of sensible heat as well as moisture (latent heat) from the buildings to the outside. Hence, in order to maintain required comfort conditions in the occupied space an air conditioning system is required which can offset the sensible and latent heat losses from the building. Air supplied to the conditioned space is heated and humidified in a winter air conditioning system to a required level of temperature and moisture content depending upon sensible and latent heat losses from the building.

Heating and humidification of air can be achieved through different solutions. FIG. 1 (prior art) shows the most popular such solution (scheme) along with a cycle on the psychrometric chart. As shown in FIG. 1, mixed air (a mixture of return air and outside air) is first pre-heated (process m-1 on the psychrometric chart) in a pre-heater, then humidified using a humidifier or an air washer (process 1-2) and then finally reheated in a re-heater (process 2-s). The reheated air at state 's' is supplied to an air-conditioned space, for example, to a building. A flow rate of supply air should be such that when released into the building at state 's', it should be able to maintain the building at state 'I' and offset sensible and latent heat losses (Qs and $Q_l$) (see FIG. 1).

The humidification of air can be achieved in several ways, e.g. by bringing the air in contact with a wetted surface, or with droplets of water as in an air washer, by adding aerosol sized water droplets directly to the air. When the air is humidified by contact with the wetted surface as in an air washer, the temperature of air decreases and its humidity increases due to a simultaneous transfer of sensible and latent heat. If the air washer functions as an adiabatic saturator, then humidification proceeds along a constant wet bulb temperature line. The final state of air is always obtained by applying conservation of mass (water) and conservation of energy equations to the humidification process.

During winter months, conventional heating and humidifying air systems for buildings consume a lot of energy often by burning fossil fuels. These systems are expensive and inefficient, and they include minimum three apparatuses: two heaters and one humidifier.

Also, no existing humidifier or pre-heater, or re-heater system provides a simple mechanism for adjusting the humidity level in a building. Conventional heating and humidifying air systems don't use displacement heating and humidifying (100% fresh air) for buildings. The problem with displacement heating and humidifying has always been that the treatment of outside air costs much more than the treatment of recirculated air or a mixing treatment.

With the proposed invention, this all can be changed, as it allows for an inexpensive implementation of displacement heating and humidifying processes of the outside air using only two apparatuses (instead of three, like in the known existing systems): one heater and one humidifier. As the heater it is possible to use any existing heater, but as the humidifier it is proposed to use a humidifier through the M-Cycle (for example, see the Maisotsenko et al. U.S. Pat. No. 6,497,107), which plays a critical role in managing temperature and moisture for heated and humidified air, which is directed to a building for winter time.

Therefore, the inventive humidifier (it can be named "humidifying air recuperator") simultaneously functions as a recuperator and as a humidifier of air directed to a building. The proposed invention allows using just one device serving as an air humidifier and air recuperator instead of several devices, while having much higher thermodynamic and heat transfer characteristics.

It is desirable for any heating and humidifying system of a building in winter time to cool the exhaust air from the building as much as possible by a heat recovery process, to return more heat to the same building. It reduces consumption of heat energy for this system. The proposed invention enables reducing the temperature of exhaust air outlet from the building by utilizing the M-Cycle through the inventive humidifying air recuperator, which allows the exhaust air temperature to approach a dew point temperature of outside air.

Thus, an increase of energy consumption requires methods and systems for heating and humidifying that utilize less energy and cost and such methods and systems have been widely sought. The present invention provides a significant step forward for minimizing costs of both heating and humidifying processes. Also it provides for reduction of the peak combustion temperature and NOx level, when as the source of heat uses a natural gas burner.

BRIEF SUMMARY OF THE INVENTION

A first embodiment of the invention is represented by an energy-saving method for heating and humidifying a building or a car's saloon, said method comprising the steps of: (a) drawing air from outside of the building or the car's saloon as an outside airstream into the building or the car's saloon; (b) passing the outside airstream along a dry channel in a first direction; (c) passing the outside airstream in a second direction, opposite to the first direction, through a wet channel being in a heat-exchange interaction with said dry channel, thereby increasing a temperature and a humidity of said outside airstream; (d) heating said outside airstream by a heat source, and thereafter directing the outside air stream to the building or the car's saloon as supply air; (e) simultaneously with step (b), introducing an exhaust airstream from inside of the building or the car's saloon into a product channel, being in a heat-exchange interaction with said wet channel, thereby decreasing a temperature and a humidity of said exhaust airstream due to condensing water vapor from said exhaust airstream into water; (f) discharging at least a portion of said exhaust airstream from said product channel to the atmosphere at a temperature approaching a dew point temperature of said outside airstream; (g) passing the outside air stream along the wet channel, and heating and humidifying said outside air stream by heat transferred from said exhaust airstream through a mutual surface of said product channel and said wet channel; and (h) drawing said water from the product channel for wetting the wet channel.

Particularly, the heat source can utilize the following types of energy: electricity, or solar, or heat of condensation from a heat pump, or exhaust heat, or a combination thereof. The heat source can be represented by a gas burner utilizing natural gas as fuel; wherein a portion of the exhaust airstream is directed to the gas burner for supporting a gas burning process therein.

A second embodiment of the invention is represented by an energy-saving system for heating and humidifying a building or a car's saloon, said system comprising:—at least one dry channel receiving an outside airstream from outside of said building or the car's saloon and passing the outside airstream therethrough in a first direction;—at least one wet channel receiving the outside airstream from the at least one dry channel and passing said outside airstream therethrough in a second direction opposite to the first direction, said at least one wet channel is in communication with said at least one dry channel;—at least one product channel receiving an exhaust airstream from inside of said building or the car's saloon and passing said inside airstream therethrough to the atmosphere; said at least one wet channel is placed between the at least one dry channel and the at least one product channel;—a heat source capable of heating up said outside air stream after said outside air stream is outlet from the at least one wet channel; wherein: said at least one wet channel is in a heat-exchange interaction with said at least one dry channel via a first membrane and said at least one product channel is in a heat-exchange interaction with said at least one wet channel via a second membrane; the first membrane has a first dry side limiting said at least one dry channel and a first wet side limiting said at least one wet channel being reversed to the first dry side; the second membrane has a second dry side limiting said at least one dry channel and a second wet side limiting said at least one wet channel being reversed to the second dry side; and water is condensed from water vapor contained in the exhaust airstream during passage thereof through said at least one product channel, wherein said water is drawn from said at least one product channel to said at least one wet channel, and wherein said water forms a film in said at least one wet channel, covering the first wet side and the second wet side.

Particularly, the first membrane and the second membrane can be made of wick, or plastic, or metal, or solid desiccants, or micro sieve, or a composition thereof.

DESCRIPTION OF PREFERRED EMBODIMENTS OF THE INVENTION

Figure 1:
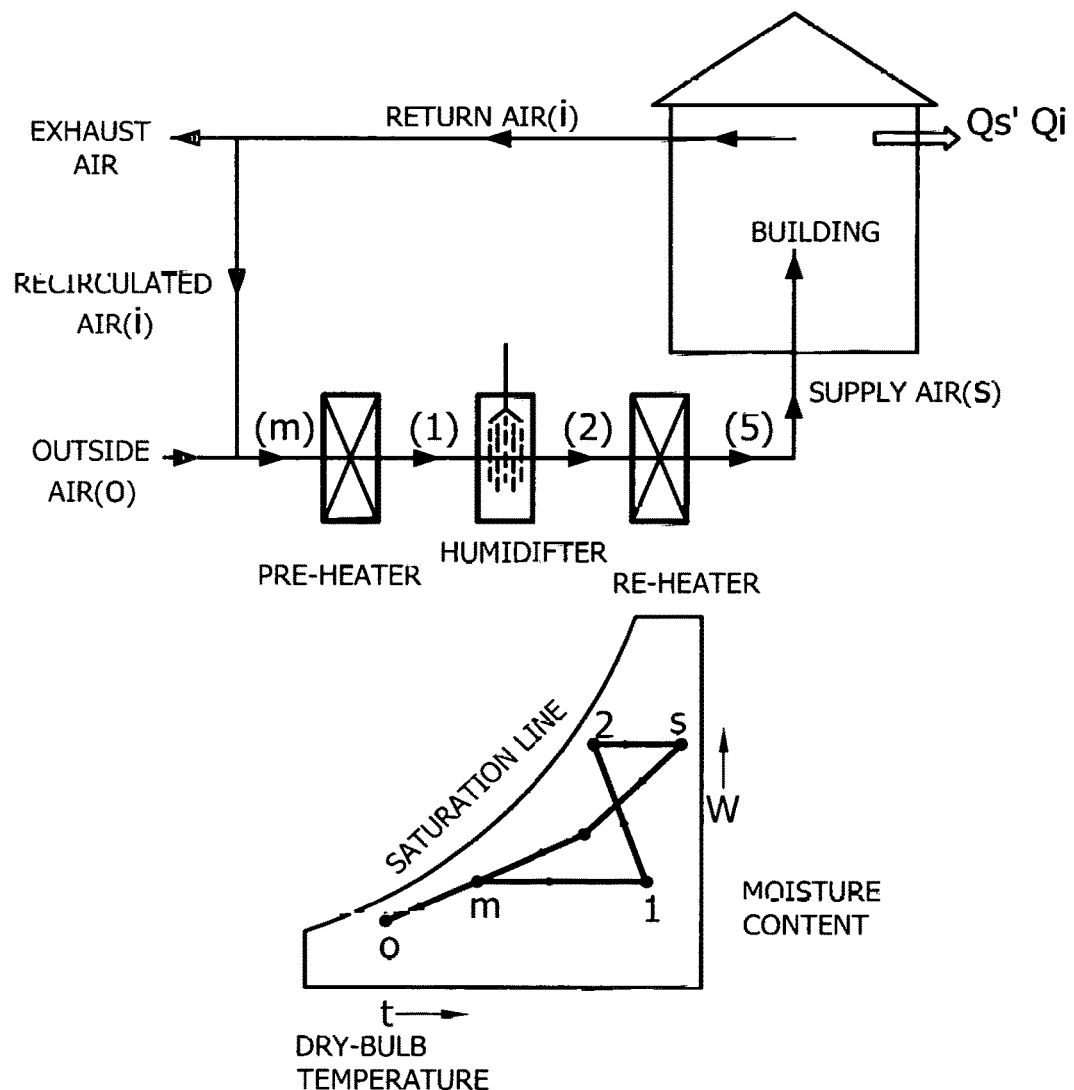
FIG. 1 (Prior Art) is a traditional schematic diagram, illustrating a prior art air heating and humidifying system with a cycle shown on the psychrometric chart.

While the invention may be susceptible to embodiment in different forms, there are shown in the drawings, and will be described in detail herein, specific exemplary embodiments of the present invention, with the understanding that the present disclosure is to be considered an exemplification of the principles of the invention, and is not intended to limit the invention to that as illustrated and described herein.

Figure 2:
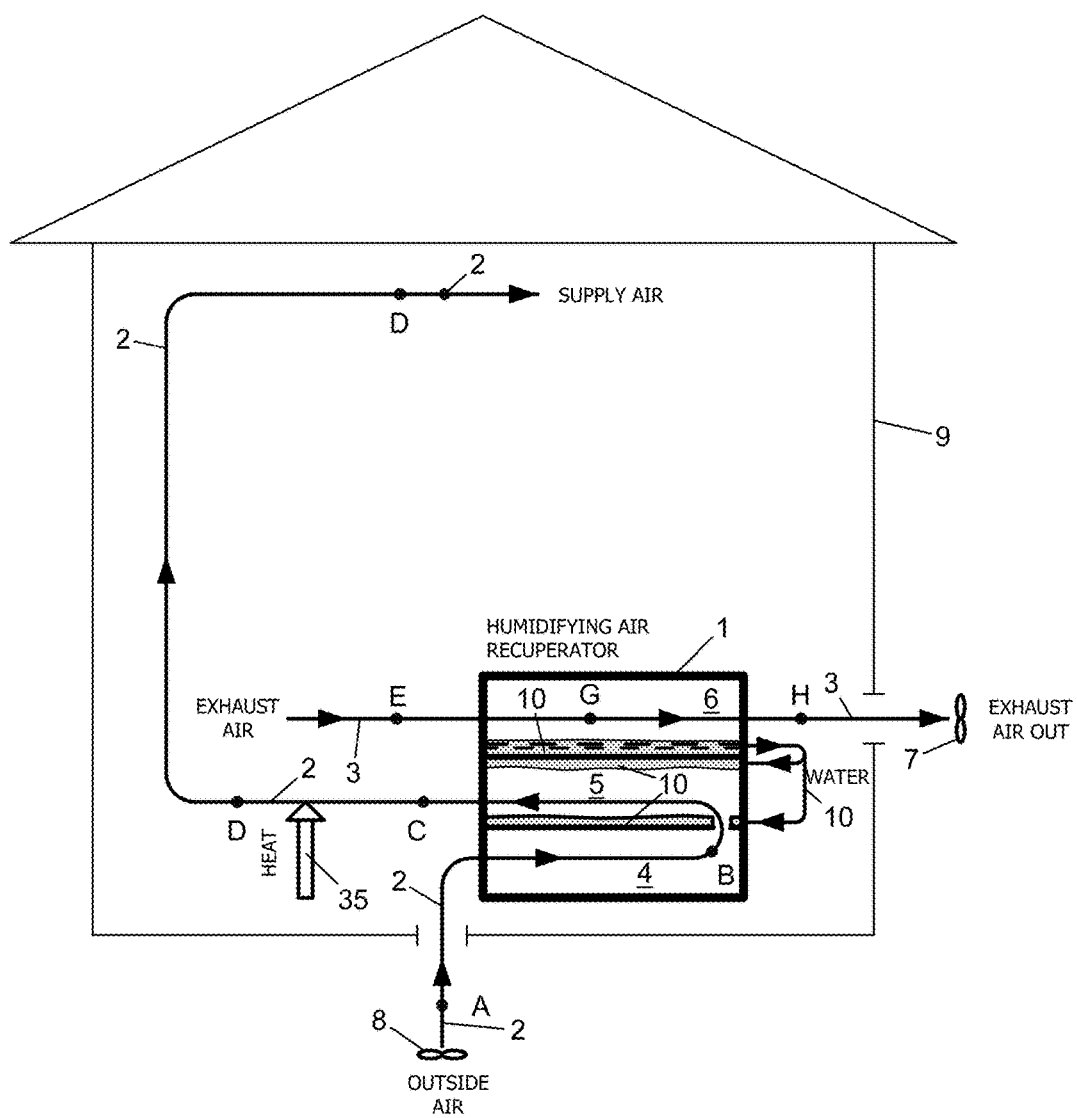
FIG. 2 is a schematic illustration, showing operation of the inventive system for energy-saving heating and humidifying of buildings using outside air through the Maisotsenko Cycle (M-Cycle).

FIG. 2 is a schematic representation of the inventive method for energy-saving heating and humidifying for a building (a room, an apartment, or the like) 9, using outside air through the Maisotsenko Cycle (M-Cycle). The proposed heating and humidifying system comprises a humidifying air recuperator 1 with a product channel 6, a cooperating dry working channel 4 and a wet working channel 5.

Cold and dry outside winter airstream 2 (point A) is directed by a fan 8 at first to the dry working channel 4 (process A-B) and next to the wet working channel 5 (process B-C) of the humidifying air recuperator 1, wherein the airstream 2 becomes saturated. Thereafter the saturated airstream 2 is sensible heated (process C-D) by any source of heat 35 (gas, electricity, solar, heat of condensation from heat pump, exhaust heat and etc.). Then the hot and moist airstream 2 is directed, as supply air (point D), to a building 9, which building is heated and humidified to make it comfortable in cold weather.

Inside of the building 9, this airstream 2 decreases its temperature and humidity (process D-E). Thereafter this airstream with a lesser temperature and humidity is directed, as an exhaust airstream 3 (point E), by a sucking fan 7, to the product channel 6 of the humidifying air recuperator 1 (see FIG. 2).

During its passing through the product channel 6, this exhaust airstream 3 is cooled below a wet bulb temperature and it approaches the dew point temperature of outside airstream 2. It helps condensing vapor of water 10 from exhaust airstream 3 inside of the product channel 6 thereby reducing its absolute humidity. Additional water will not be needed for the proposed invention, because this system constantly reclaims water from the exhaust airstream 3.

This condensable water 10 is directed from the product channel 6 for wetting of the wet working channel 5. Condensable water is a result of the reduction of temperature of the exhaust airstream 3, which approaches the dew point temperature of outside air, after its passing through the product channel 6 (point H).

Therefore after passing through the product channel 6 the cold and dry exhaust airstream 3 is sucked by a sucking fan 7 and discharged to the atmosphere (point H) with temperature, which approaches the dew point temperature, and it is always less than the dry bulb temperature of outside airstream 2 (see FIG. 2). It brings up formation of sensible heat.

Also, there is condensation of vapor from water 10 extracted from the exhaust airstream 3 inside the product channel 6, which causes formation of latent heat. Because of this heat exchange mechanism between the exhaust airstream 3 (during its passing through the product channel 6) and the outside airstream 2 (during its passing through the wet working channel 5), sensible heat and latent heat are transferred through corresponding adjacent surfaces of the channel 6 and channel 5 from the exhaust airstream 3 to the outside airstream 2. The condensed water 10 is directed from the product channel 6 for wetting the wet channel 5.

The process of extraction of sensible and latent heat from the exhaust airstream 3, during its passing through the product channel 6, is used to heat up and humidify the outside airstream 2, as it passes through at first to the dry working channel 4 and next to the wet working channel 5. Thereafter, the heated moisturized and saturated outside airstream 2 (point C, FIG. 2) is sensible heated (process C-D) by a heat source 35. Then the hot and moisturized airstream 2 is directed into the building 9 as supply air (point D, FIG. 2).

The cold and dry outside winter airstream 2, which is directed by a forced draft fan 8 at first to the dry working channel 4 and next to the wet working channel 5, can have temperature below freezing, for example 30° F. or 2° F.

It is well known, that water would freeze below 32° F. and freeze faster at 2° F. Using the proposed humidifying air recuperor 1, the process of freezing of water does not occur. This is because the warm exhaust airstream 3, passing through the product channel 6 brings a lot of heat. This heat (sensible and latent) is transferred from the product channel 6 to the wet working channel 5 by the high efficiency heat transfer process. It is the reason that the temperature of the surface of wet working channel 5 (wetted by water 10) is always higher than 32° F., which guarantees no freezing process.

Thereby (see FIG. 2) the product channel 6 is used for recovery of heat by cooling and dehumidifying of the warm and moist exhaust airstream 3, which is taken away from the building 9. The exhaust airstream 3 is fed via the product channel 6 and simultaneously the cold and dry outside winter airstream 2 is fed via the dry working channel 4 of the same humidifying air recuperator 1. Passing at first through the dry working channel 4 and after through the wet working channel 5, outside winter airstream 2 increases its temperature and moisture by recovering the sensible and latent heat from the warm and moisten exhaust airstream 3.

The wet working channel 5 is always placed between the dry working channel 4 and the product channel 6. It is arranged in a heat transfer contact with the channels via membranes. Any such membrane has a dry heat exchange surface, limiting the corresponding dry working channel 4 and the product channel 6. The reverse side of the membrane is wetted with a moving film of evaporative liquid, for example, water 10 using any available known method. The wetted sides of the two membranes create the wet working channel 5.

The membranes can be made of wick, plastic, metal, solid desiccants, micro sieve, etc. materials or composition of these materials. It is understood that the term 'membrane' is used, but any structure that performs the function of separating the dry working channel 4 from wet working channel 5 or the wet working channel 5 from the product channel 6 is suitable.

The cold and dry outside winter airstream 2 is pushed by the fan 8 through the cooperating dry working channel 4 and wet working channel 5. The exhaust airstream 3 is drawn from the building 9 by the fan 7. This exhaust airstream 3 is directed to the product channel 6 of the humidifying air recuperator 1. Passing through the product channel 6, the exhaust airstream 3 is cooled approaching the dew point temperature of the outside airstream 2 while reducing its moisture content.

At the same time the dry and cold outside winter airstream 2, is directed to the dry working channel 4 in contact with a heat exchange surface of the dry side of membrane. In so doing, the outside winter airstream 2 is cooled, because of heat absorption due to evaporation occurring in the wet working channel 5, without changing its moisture content. After that the winter airstream 2 is turned to the wet working channel 5, where it flows counter currently in contact with the moistened surfaces, for example, with wick or capillary-porous material being wetted by water 10. As the winter airstream 2 passes along the wet working channel 5 it is heated up by the heat source 35, moistened and thereafter it is directed to the building 9 as supply air.

As the winter airstream 2 passes along the dry working channel 4, it is cooled as a result of the heat exchange by the same flow passing along the wetted surface of the wet working channel 5 that are wetted by water 10. In the wet working channel 5, latent heat of evaporation is removed which results in the cooling of the winter airstream 2 on the wet surface and eventually owing to heat transfer via the membrane giving pre-cooling of the winter airstream 2 in the dry working channel 4.

Should outside air taken directly from the atmosphere be used as the winter airstream 2, passing through the dry working channel 4, then by the time it has passed through the dry working channel 4 and contacts moisture in the wet working channel 5, it will have cooled down to near the dew point temperature of the winter airstream 2. In so doing, the exhaust airstream 3 can be cooled in an ideal case to the dew point temperature of outside air by the evaporative action in the wet working channel 5, taking latent heat from the heat exchange membrane between the product channel 6 and the wet working channel 5. In fact, this temperature will be still higher due to the membrane thermal resistance.

It should be noted that, in winter time, temperatures of outside air are typically less than temperatures in other times of a year. Therefore, in winter time, the absolute humidity and, consequently, the dew point temperatures of outside air are less than the dew point temperatures in other times of the year. Hence, by cooling of the exhaust airstream 3, during its passing through the product channel 6, and its approaching the dew point temperature of outside air, in winter time, it is possible to recover significantly more heat from the exhaust airstream 3 than in other times of the year. This is a novel conception of the inventive method and system for heating and humidifying of buildings utilizing the psychrometric energy from outside air through the M-Cycle. In other words, when outside air temperature is lower there is an increase of driving force for the heat recovery process and its thermal efficiency raises.

Thereby the proposed humidifying air recuperator 1 as a special heat and mass exchanger is an efficient cooler for the exhaust airstream 3, and simultaneously it is a unique saturator, which intensively heats up and humidifies the outside airstream 2 before its coming into the building 9. During passing through the wet working channel 5, the outside airstream 2 increases its temperature and significantly increases its absolute humidity, which is always well over that one obtainable from any other known methods of humidifying. The increased temperature and especially increased humidity raises enthalpy, which is a sum of latent and sensible heat. It also increases a volumetric flow rate of the hot and moist outside airstream 2, after its passing through the wet 5 working channel. After this the hot and moist outside airstream 2 is supplied with heat from a heat source 35, and then the airstream 2 is directed to the building 9 as supply air. It is important to emphasize, enthalpy (being a heat-moisture parameter of supply air) of the hot and moist outside airstream 2 (point D, FIG. 2), is determined by two factors: heat transfer (sensible and latent heat) from the exhaust airstream 3, during passing thereof through the product channel 6, and heat supply from the heat source 35.

A higher enthalpy and volume of the hot and moist outside airstream 2 (point D, FIG. 2), which is directed to the building 9, means that there is more heat power and moisture, which were received by the heat recovery process and thereby it improves comfort in the building 9 in cold weather with minimum consumption of heat energy from the heat source 35.

The proposed method for heating and humidifying of buildings can use any source of heat (natural gas, electricity, solar, exhaust heat and etc.). Usually air supplied to a conditioned space of the building 9 is heated in the winter time by natural gas. The environmental performance of heating systems for buildings heated by natural gas has a great deal to do with this issue. Any burning process is a polluted procedure, and the invention allows reducing pollutions.

Figure 3:
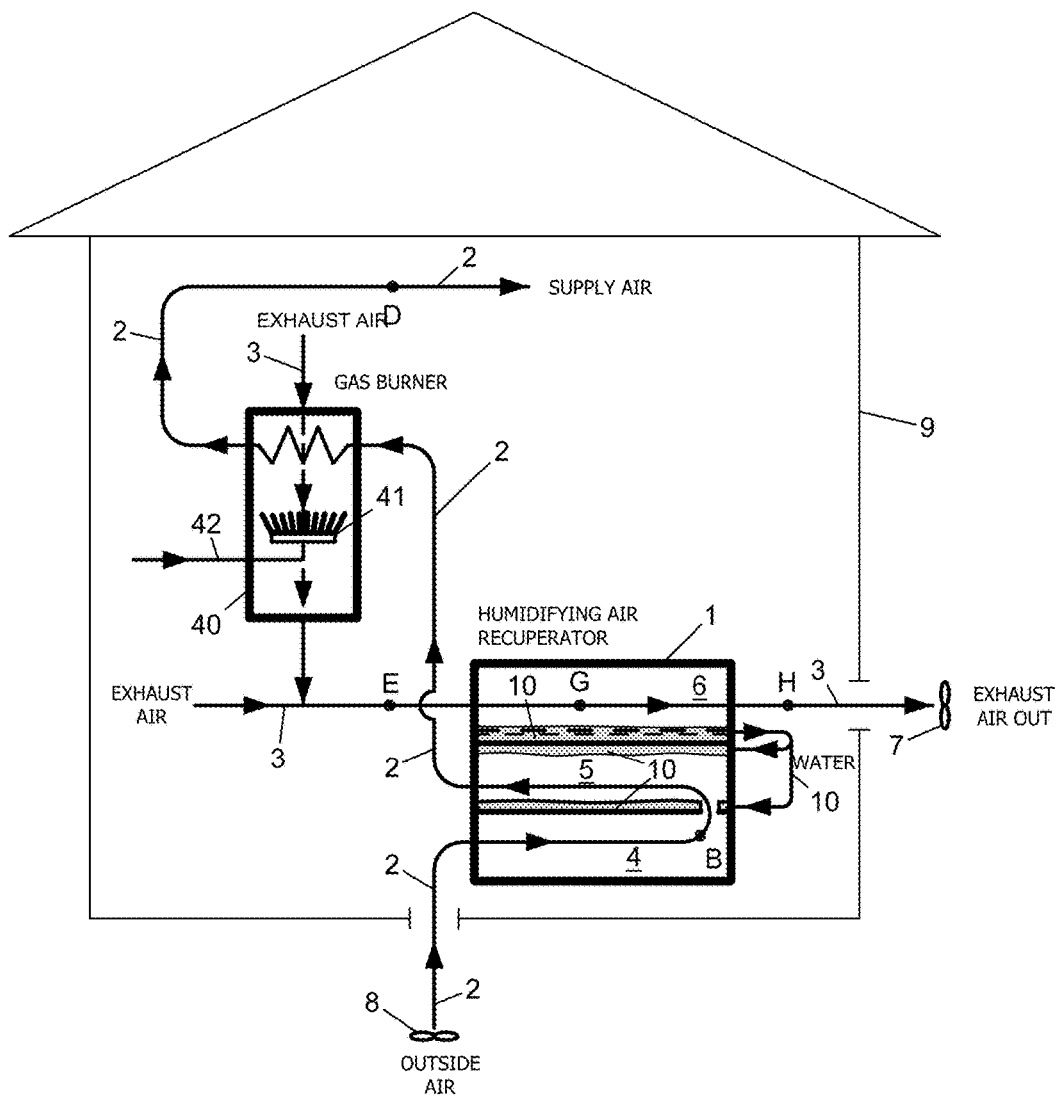
FIG. 3 is a schematic illustration, showing operation of the inventive system for energy-saving heating and humidifying of buildings using outside air through the M-Cycle, wherein the air supplied to the conditioned space of the building is heated by natural gas.

FIG. 3 is a schematic representation of the method for energy-saving heating and humidifying of buildings which contain a burner 40 with a torch 41 and the natural gas input 42. As the winter airstream 2 passes at first along the dry working channel 4 and after through the wet working channel 5 of the humidifying air recuperator 1, it is heated, moistened and after it is directed as the saturated airstream 2 through the natural gas burner 40 to the building 9. Passing through the gas burner 40 this saturated airstream 2 is sensible heated by indirect contact with burning natural gas 42. Then the hot and moist airstream 2, as supply air, is directed to the building 9, which is heated and humidified to make the building 9 comfortable in cold weather.

Inside of the building 9, this airstream 2 reduces its temperature and humidity (process D-E, FIG. 3). Thereafter, this air with lesser temperature and humidity as the exhaust airstream 3 (point E, FIG. 3) is directed by a sucked fan 7 to the product channel 6 of the humidifying air recuperator 1. Some relatively small part of the exhaust airstream 3 is directed to a gas burner 40 for supporting of the gas burning process.

Later on, the exhaust gas after the burning process is directed from the gas burner 40 to the product channel 6 of the humidifying air recuperator 1 too (see FIG. 3). This process has an additional advantage of the proposed method and systems for heating and humidifying of buildings. Because the exhaust airstream 3 contains a lot of water vapor pollution from the burning process is dramatically reduced due to the water vapor creating a more even burning process during combustion inside of the gas burner 40. Using the humidifying air recuperator 1, it is possible to reduce nitrogen oxides (NOx) at about 85-95% and simultaneously to recovery heat from exhaust gas. Unlike with conventional heating technologies, the heat from exhaust gases through the humidifying air recuperator 1 will not be wasted to the atmosphere but will be returned back to the gas burner 40, which thermal efficiency can be increased by this proposed system.

The flow rate of supply airstream 2 at point A (FIG. 3) should be such that when released into the building at point D, it should be able to maintain the building at point E of the exhaust air 3 and offset the sensible and latent heat losses (see FIG. 2).

After passing along the wet working channel 5, the heated, humidified and saturated airstream 2 is additionally heated by the heat source 35 (shown in FIG. 2). If the heat source 35 uses natural gas as fuel, it is represented by a gas burner 40 (shown in FIG. 3). The amount of heat required for the inventive system for maintaining optimal indoor air conditions is about three times less than for conventional heating systems. Thereby, realizing the proposed method for heating and humidifying of buildings allows achieving a significant reduction (about 3 times) of heat consumption from the heat source 35, using the displacement heating process (100% fresh air) for buildings in winter time.

Figure 4:
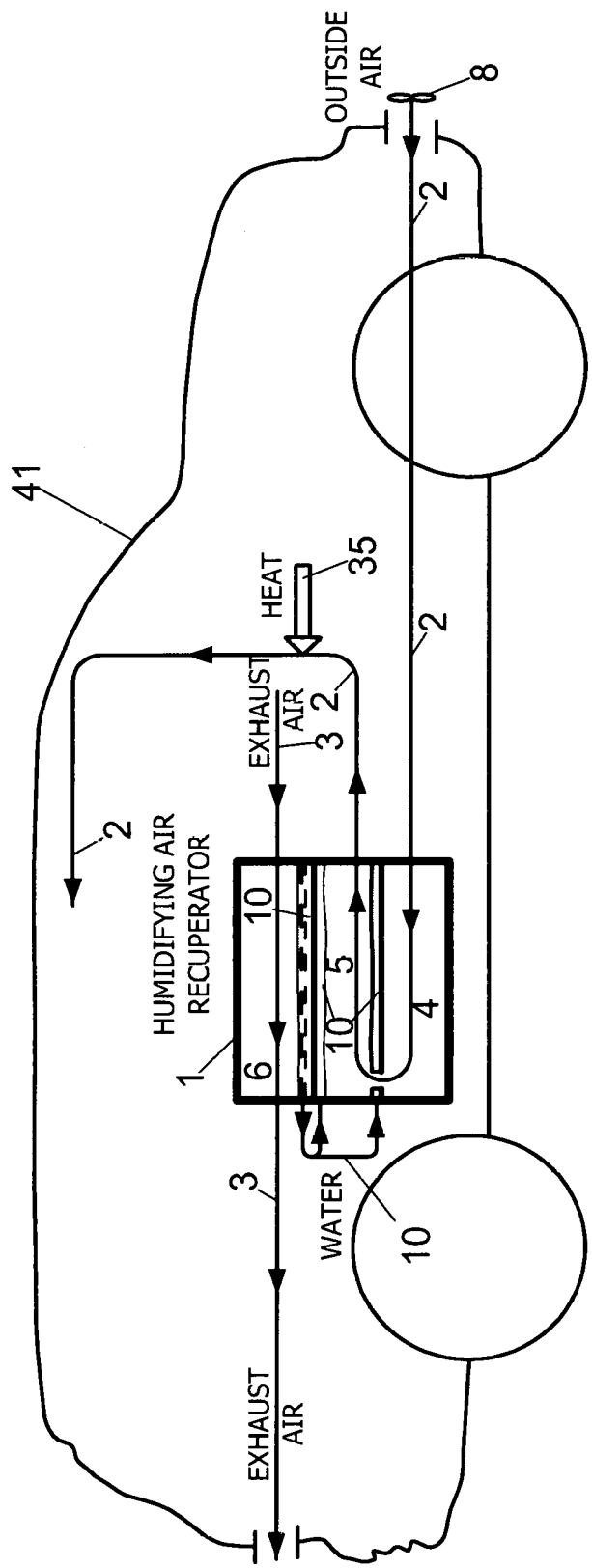
FIG. 4 is a schematic illustration, showing operation of the inventive system for heating and humidifying for a car's saloon.

FIG. 4 is a schematic representation, illustrating operation of the present invention of a method for heating and humidifying a car's saloon.

The present invention can be used for the heating and humidifying systems for a saloon 41 of a car in winter time utilizing the psychrometric energy from outside air through the M-Cycle. This method allows for a substantial economy in energy consumption compared to the hitherto known systems, via the unique humidifying air recuperator 1. Especially this system is suitable for an electric car, which doesn't use heat from an internal combustion engine for heating and humidifying of the car's saloon in winter time.

It is expedient to use Coolerado ERV (energy recovery ventilation system) as the humidifying air recuperator 1, which Coolerado Corporation from Denver (USA) currently produces for the market.

Figure 5:
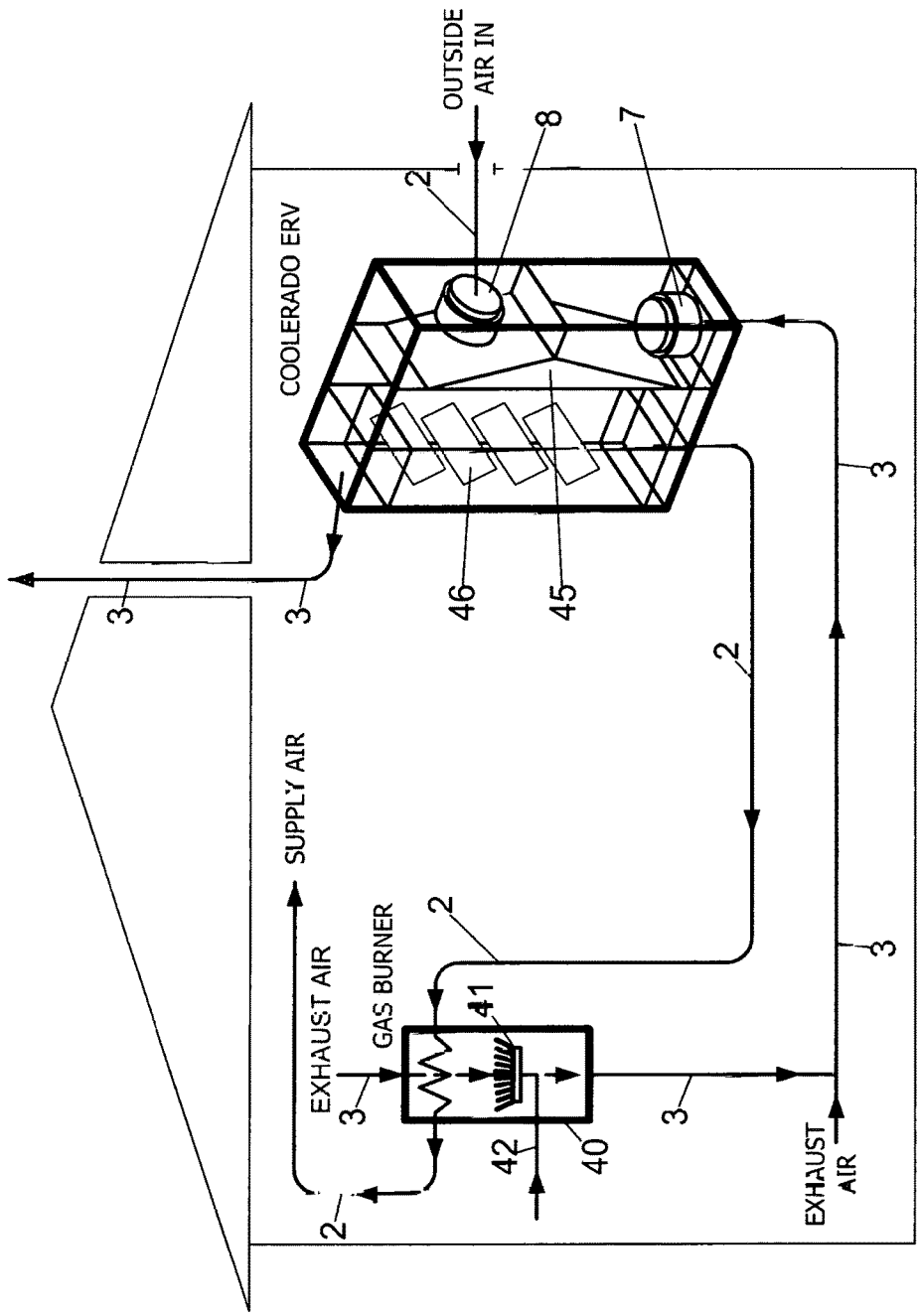
FIG. 5 is a illustration, showing operation of the inventive system for energy-saving heating and humidifying of buildings using Coolerado ERV (energy recovery ventilation system).

FIG. 5 is a representation, illustrating operation of the inventive system for energy-saving heating and humidifying of buildings using the Coolerado ERV. The Coolerado ERV is a very efficient energy recovery ventilation system on the market made due to a high efficiency of its heat and mass exchanger (HMX), which is the main element thereof (www.coolerado.com).

More detail information about the HMX may be obtained from the following article: Gillan, L. "Maisotsenko Cycle for Cooling Processes", 2008, Int'l Journal of Energy for Clean Environment, 9, pp. 47-64.

The Coolerado ERV (see FIG. 5) contains a sucking fan 7 with a filter for the exhaust airstream 3; an enforced draft fan 8 with a filter for the outside airstream 2, five HMX sections 45 and condensate baffles 46.

The cold and dry outside winter airstream 2 is directed by the fan 8 at first to the dry working channel 4 and next to the wet working channel 5 for all of the five HMX sections 45. Then the heated and humidified saturated outside airstream 2 is directed to a gas burner 40, where it is sensible heated by burning of natural gas 42. Thereafter the hot and moisturized airstream 2, as supply air is directed to the building 9, which is heated and humidified to make the building comfortable in cold weather. Inside of the building, this supply airstream 2 reduces its temperature and humidity. Next, this air with lesser temperature and humidity as the exhaust airstream 3 is directed by the sucking fan 7 to the product channels 6 for all five HMX sections 45 (see FIG. 5). Then, after passing through the product channel 6, the cold and dry exhaust airstream 3 is discharged by the fan 7 to the atmosphere with a temperature approachable the dew point temperature.

The HMX was developed to economically commercialize the M-Cycle with a new heat rejection and recovery methods. The HMX consists of several sheets of a polyethylene infused with a biocide material that is designed to wick fluids evenly. The sheets are stacked one-upon-another, separated only by channel guides that are placed on one side of the sheet.

One side of each sheet is also coated with polyethylene. The channel guides that are attached to the polyethylene sides of the sheet run along the length of the sheet. The guides that are placed on the non-coated side run along the width of the sheet. Their purpose is to provide structure as well as guide for air movement within HMX.

When assembled, the coated side of the top sheet is placed facing down, while the coated side of the second sheet is placed facing up. These two-coated sheets, when placed together form the dry channels 4 and 6 (see FIG. 2). Conversely, the underside of the second sheet, which is uncoated, is then placed with the third sheet, uncoated side-up, to form the wet channel 5. This pattern of alternating the wet channels 5 and dry channels 4 and 6 reoccurs throughout the height of HMX.

There are two kinds of dry channels: one dry channel is used as the product channel 6 for the exhaust airstream 3 and other is used as the working dry channel 4 for the cold and dry outside winter airstream 2.

The exhaust airstream 3 is always separate from the winter airstream 2 and remains within product channels 6 the entire length of the heat exchanger. Consequently, the exhaust airstream 3 is cooled as it travels the distance of the core and into the designated cooling space. The working air channels (the innermost channels) are blocked at the opposite end of the inlet, preventing the winter airstream 2 from ever reaching the exhaust airstream 3. The heat from the exhaust airstream 3 is removed evaporatively in the wet channels 5 and then transferred through a surface for the winter airstream 2 as the heated and fully saturated air. This airstream 2 after simultaneously heating and as humidifying processes, during its passing at first through the dry working channel 4 and after wet working channel 5, is directed through the gas burner 40 to the building 9 as the supply airstream 2 (see FIG. 5).

The special polyethylene infused with a biocide material used in the manufacture of the heat exchanger acts as a natural capillary wick within the wet channels 5. The natural wicking assures uniform wetting within HMX with no excess fluid, thereby focusing the energy removal on the cooling of the exhaust airstream 3. The wicking nature of the polyethylene infused with a biocide material also helps break down the surface tension of the fluid, resulting in a higher mass and heat transfer rate.

The polyethylene is used because of its low thermal resistance through its thickness while maintaining a high thermal resistance along its width and length.

Subsequently, the heat transferred from the exhaust airstream 3 to the winter airstream 2 is concentrated at many points through its thickness producing a sharp contrast in temperature all along the width and length. This heat transfer occurs multiple times in a limited physical space within the same HMX, resulting in a progressively lower temperature as the exhaust airstream 3 continues to flow across the winter airstream 2.

We claim:

1. An energy-saving method for heating and humidifying a building, said method comprising the steps of:
   (a) drawing air from outside of the building as an outside airstream (2) into the building;
   (b) passing the outside airstream (2) along a dry channel (4) in a first direction;
   (c) passing the outside airstream (2) in a second direction, opposite to the first direction, through a wet channel (5) being connected to said dry channel (4) such that the dry channel (4) and the wet channel (5) form a single U-shape turn connection; wherein said wet channel (5) is in a heat-exchange interaction with said dry channel (4), thereby increasing a temperature and a humidity of said outside airstream (2);
   (d) heating said outside airstream (2) by a heat source (35), and thereafter directing the outside airstream (2) to the building as supply air;
   (e) simultaneously with step (b), introducing an exhaust airstream (3) from inside of the building into a product channel (6) being in a heat-exchange interaction with said wet channel (5), thereby decreasing a temperature and a humidity of said exhaust airstream (3) due to condensing water vapor from said exhaust airstream (3) into water (10);
   (f) discharging at least a portion of said exhaust airstream (3) from said product channel (6) to the atmosphere at a temperature approaching a dew point temperature of said outside airstream (2);
   (g) passing the outside air stream (2) along the wet channel (5), and heating and humidifying said outside air stream (2) by heat transferred from said exhaust airstream (3) through a mutual surface of said product channel (6) and said wet channel (5); and
   (h) drawing said water (10) from the product channel (6) for wetting the wet channel (5).

2. The energy-saving method according to claim 1, wherein: the heat source (35) utilizes the following types of energy: electricity, or solar, or heat of condensation from a heat pump, or exhaust heat, or a combination thereof.

3. The energy-saving method according to claim 1, wherein: the heat source (35) is represented by a gas burner (40); said gas burner (40) utilizes natural gas as fuel;

wherein a portion of the exhaust airstream (3) is directed to the gas burner (40) for supporting a gas burning process therein.

* * * * *